(12) United States Patent
Verhoeven et al.

(10) Patent No.: US 12,293,008 B2
(45) Date of Patent: May 6, 2025

(54) SECURITY DEVICE

(71) Applicant: NXP USA, Inc., Austin, TX (US)

(72) Inventors: Henri Verhoeven, Someren (NL);
Edwin Schapendonk, Oss (NL);
Oswald Moonen, Eindhoven (NL);
Matheus Johannus Gerardus Lammers, Nederweert (NL)

(73) Assignee: NXP USA, Inc., Austin, TX (US)

( * ) Notice: Subject to any disclaimer, the term of this patent is extended or adjusted under 35 U.S.C. 154(b) by 220 days.

(21) Appl. No.: 17/663,333

(22) Filed: May 13, 2022

(65) Prior Publication Data
US 2023/0367917 A1    Nov. 16, 2023

(51) Int. Cl.
*G06F 21/86*    (2013.01)
*G06K 19/07*    (2006.01)
*G06K 19/077*   (2006.01)
*B42D 25/24*    (2014.01)

(52) U.S. Cl.
CPC ......... *G06F 21/86* (2013.01); *G06K 19/0723* (2013.01); *G06K 19/07786* (2013.01); *G06K 19/07798* (2013.01); *B42D 25/24* (2014.10)

(58) Field of Classification Search
None
See application file for complete search history.

(56) References Cited

U.S. PATENT DOCUMENTS

| | | | |
|---|---|---|---|
| 6,588,660 B1* | 7/2003 | Buescher | G06K 19/07345 235/382 |
| 10,725,077 B2 | 7/2020 | Verhoeven et al. | |
| 11,182,770 B1* | 11/2021 | Yan | H04B 5/48 |
| 2007/0268113 A1* | 11/2007 | Johnson | G08B 13/2414 340/10.1 |
| 2008/0036196 A1* | 2/2008 | Steenblik | G02B 3/0031 283/109 |
| 2010/0060427 A1 | 3/2010 | Furumura et al. | |
| 2021/0110690 A1* | 4/2021 | Suwald | G01D 5/24 |
| 2021/0383725 A1* | 12/2021 | Dehmubed | G09F 3/0292 |

OTHER PUBLICATIONS

U.S. Appl. No. 18/810,404, filed Aug. 20, 2024; 42 pages.
U.S. Appl. No. 18/606,562, filed Mar. 15, 2024; 29 pages.

* cited by examiner

*Primary Examiner* — Christopher C Harris

(57) ABSTRACT

One example discloses a security device, including: a bulk security capacitance, including a first endpoint and a second endpoint, and having, a first layer including a first set of conductive elements, the first endpoint, and the second endpoint; and a second layer including a second set of conductive elements; wherein the first set of conductive elements and the second set of conductive elements together form at least two bulk capacitors in series; wherein the first and second layers are separated by a distance; and wherein the first and second endpoints are configured to be coupled to a tamper detection circuit configured to detect a change in the bulk security capacitance.

22 Claims, 7 Drawing Sheets

SECURITY DEVICE

The present specification relates to systems, methods, apparatuses, devices, articles of manufacture and instructions for security.

SUMMARY

According to an example embodiment, a security device, comprising: a bulk security capacitance, including a first endpoint and a second endpoint, and having, a first layer including a first set of conductive elements, the first endpoint, and the second endpoint; and a second layer including a second set of conductive elements; wherein the first set of conductive elements and the second set of conductive elements together form at least two bulk capacitors in series; wherein the first and second layers are separated by a distance; and wherein the first and second endpoints are configured to be coupled to a tamper detection circuit configured to detect a change in the bulk security capacitance.

In another example embodiment, the first set of conductive elements in the first layer includes a first pad coupled to the first endpoint, and a second pad coupled to the second endpoint; and the second set of conductive elements in the second layer include a first pad and a second pad coupled to each other with a conductive trace.

In another example embodiment, the first pad of the first set of conductive elements is positioned directly above the first pad of the second set of conductive elements; and the second pad of the first set of conductive elements is positioned directly above the second pad of the second set of conductive elements.

In another example embodiment, the first pads and the second pads form the at least two bulk capacitors in series.

In another example embodiment, the first set of conductive elements in the first layer further include a plurality of additional pads, a first half of which are coupled to the first endpoint, and a second half of which are coupled to the second endpoint; and the second set of conductive elements in the second layer further include a plurality of additional pairs of pads each pair coupled to each other with additional conductive traces.

In another example embodiment, each pair of pads is separated from each other by an equal distance.

In another example embodiment, a pair of pads is located at each corner of the second layer.

In another example embodiment, the plurality of additional pads in the first and second layers form sets of in series bulk capacitors, each set of which is in parallel with each other.

In another example embodiment, the first set of conductive elements in the first layer includes an inner set of pads coupled to the first endpoint, and an outer set of pads coupled to the second endpoint; and the second set of conductive elements in the second layer include a first pad and a second pad coupled to each other with a conductive trace.

In another example embodiment, the inner set of pads are each coupled to each other; and the outer set of pads are each coupled to each other and surround the inner set of pads.

In another example embodiment, the first layer further includes a third endpoint and a fourth endpoint; and the first, second, third and fourth endpoints from the bulk capacitors in the security capacitance together form a capacitive Wheatstone Bridge.

In another example embodiment, further comprising a third layer coupled between the first layer and the second layer.

In another example embodiment, either the first or second layers are translucent; and the third layer includes at least one of: a picture, a QR-code, and/or printed text.

In another example embodiment, the third layer includes an integrated circuit; and the IC is galvanically coupled to the first set of conductive elements in the first layer.

In another example embodiment, the first layer includes an antenna configured to be coupled to a transmitter or receiver.

In another example embodiment, the transmitter or receiver includes a tuning circuit; and the security capacitance is configured to alter tuning parameters in the tuning circuit.

In another example embodiment, the tuning circuit includes at least four capacitors formed by the security capacitance.

In another example embodiment, the security capacitance is configured to set at least one of a resonant operating frequency and/or an operating bandwidth of the antenna and the transmitter or receiver combination.

In another example embodiment, the antenna is configured to couple near-field signals to the transmitter or receiver.

In another example embodiment, the antenna includes, a coil configured to couple near-field magnetic signals to the transmitter or receiver; and a conductive plate configured to couple near-field electric signals to the transmitter or receiver.

In another example embodiment, the first and second layers can have a same or different shape; and the shape includes at least one of: a rectangle, an oval, a polygon, and/or a random organic shape.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
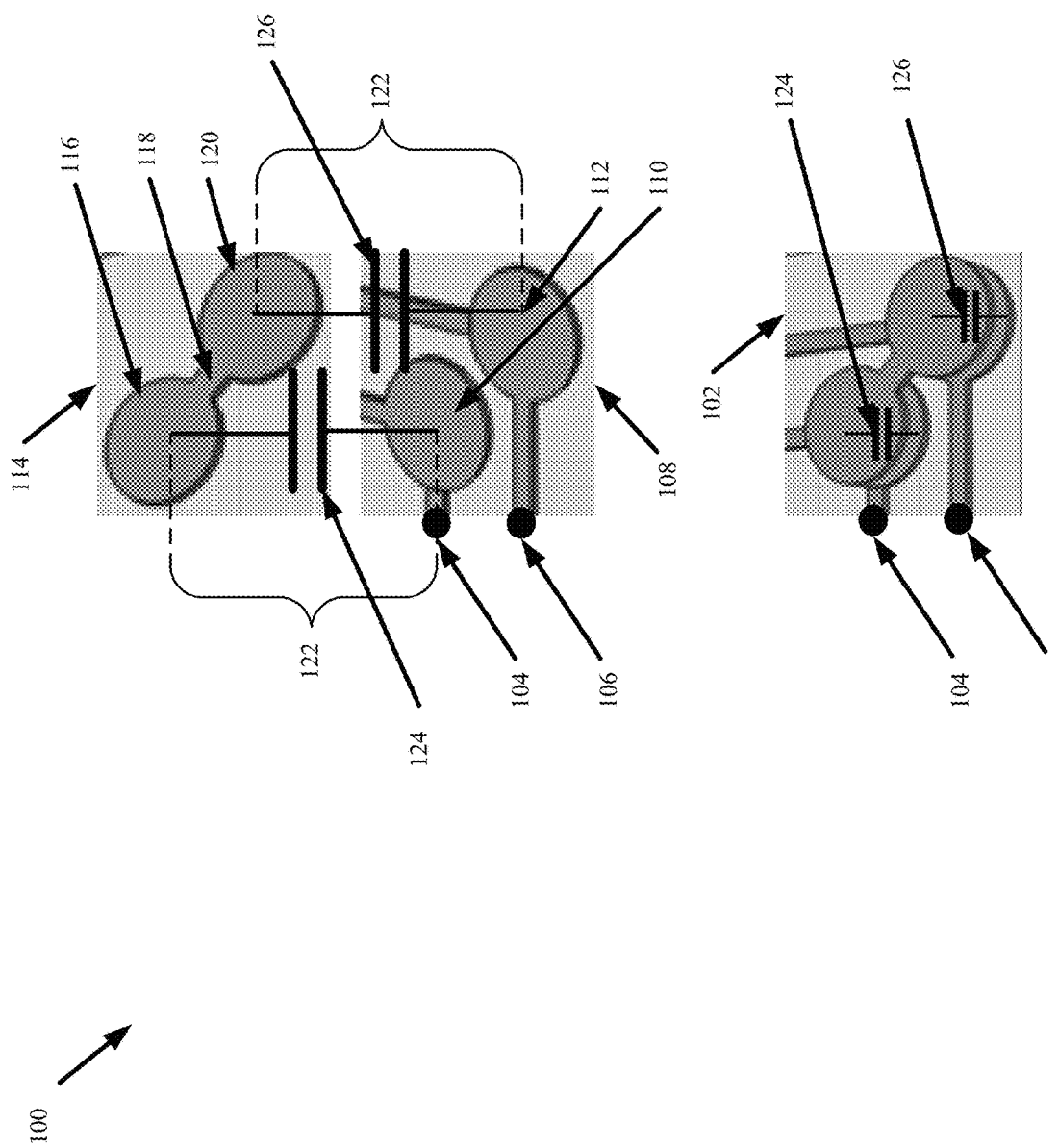
FIG. 1 represents a first example of a security device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

A security/tamper detection device including a bulk security capacitance detection element in combination with a detection circuit, perhaps including an NFC chip is now discussed. In some example embodiments, the security/tamper detection device will check for tampering during a discrete authentication procedure, while in other example embodiments, the security/tamper detection device will check for tampering on a pre-programmed bases, such as during an auditing procedure.

For example, the security/tamper detection device can be used to authenticate a person's passport. The passport likely includes the person's photograph, a passport number, and perhaps a machine readable QR or BAR code. The security/tamper detection device, as is discussed further herein, is employed to prevent/discourage tampering with such authentication material (i.e. the person's photograph, a passport number, and perhaps a machine readable QR or BAR code).

In other example embodiments, the security/tamper detection device can be used to authenticate many other printed documents, packages, bottles, medicine, electronic equipment, vehicles, etc.

FIG. 1 represents a first example of a security device 100. The first security device 100 includes a bulk security capacitance 102 embedded within a tamper detection circuit such as will be discussed in FIGS. 5, 6A and 6B. The security capacitance 102 includes a first endpoint 104 and a second endpoint 106 embedded within a first layer 108. The first layer 108 includes a first set of conductive elements (i.e. pad 110 galvanically coupled to the first endpoint 104 and pad 112 galvanically coupled to the second endpoint 106).

The security capacitance 102 also includes a second layer 114. The second layer 114 includes a second set of conductive elements (i.e. pad 116 coupled to a trace 118, which is coupled to a pad 120). The first layer 108 and second layer 114 are separated by a distance 122 thereby forming at least two bulk capacitors in series 124, 126.

In some example embodiments, the first and second layers 108, 114 are flexible and may include one or more adhesive surfaces configured to be attached to a variety of items to be authenticated, such as those discussed above. The first and second layers 108, 114 in various example embodiments may be either opaque or transparent.

The pads 110, 112, 116, 120 when placed in pairs directly over each other, maximize a bulk capacitance, as distinguished from any stray/parasitic capacitances that may also be present.

The first and second endpoints 104, 106 are coupled to the tamper detection circuit which is configured to detect a change in the bulk security capacitance 102.

Tampering is detected if the distance 122 between one or more of the conductive elements in either layer changes (e.g. peeling/removing one or more of the capacitive layers), and/or if any of the conductive traces in either layer is damaged (e.g. torn).

Figure 2:
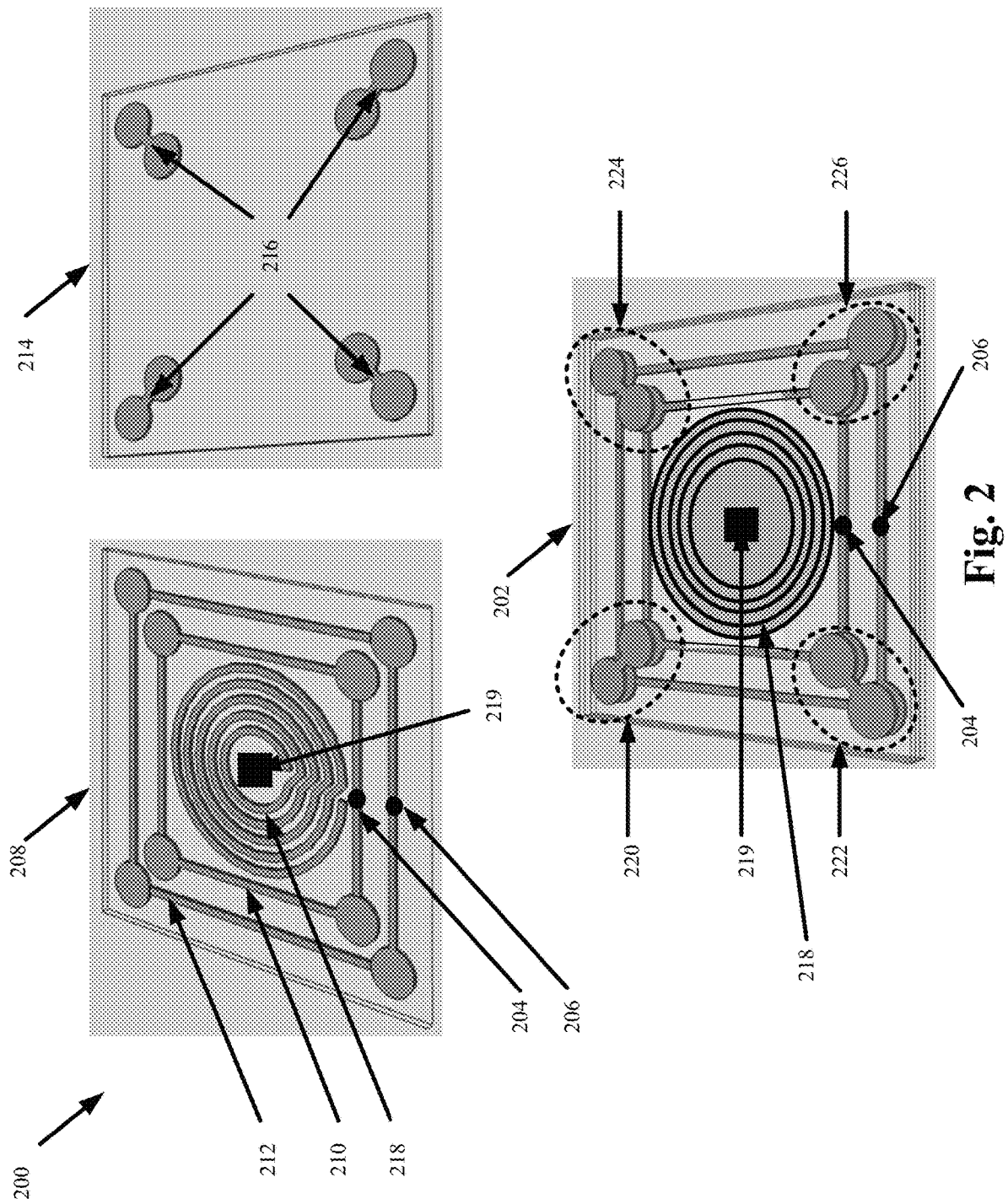
FIG. 2 represents a second example of the security device.

FIG. 2 represents a second example of the security device 200. The second security device 200 includes a bulk security capacitance 202 also configured to be embedded within a tamper detection circuit. The security capacitance 202 includes a first endpoint 204 and a second endpoint 206 embedded within a first layer 208. The first layer 208 includes a first set of conductive elements (i.e. an inner set of pads and traces 210 galvanically coupled to the first endpoint 204 and an outer set of pads and traces 212 galvanically coupled to the second endpoint 206).

The security capacitance 202 also includes a second layer 214. The second layer 214 includes a second set of conductive elements 216 (i.e. each set including two pads coupled by a trace). The first layer 208 and second layer 214 when placed at a distance 222, such as in the final security capacitance 202, forms at least four sets of bulk capacitors in series 220, 222, 224, 226, wherein each set is in parallel with each other set.

Also shown in this second example of the security device 200 is an antenna 218 and transceiver and tamper detection circuitry 219 (e.g. IC chip) embedded in the first layer 208, which can be coupled to the tamper detection circuit to enable remote sensing of a state of the bulk security capacitance 202 for any signs of tampering.

The first and second layers 208, 214 can have a same or different shape. The shape in various example embodiments includes at least one of: a rectangle, an oval, a polygon, and/or a random organic shape.

Figure 3:
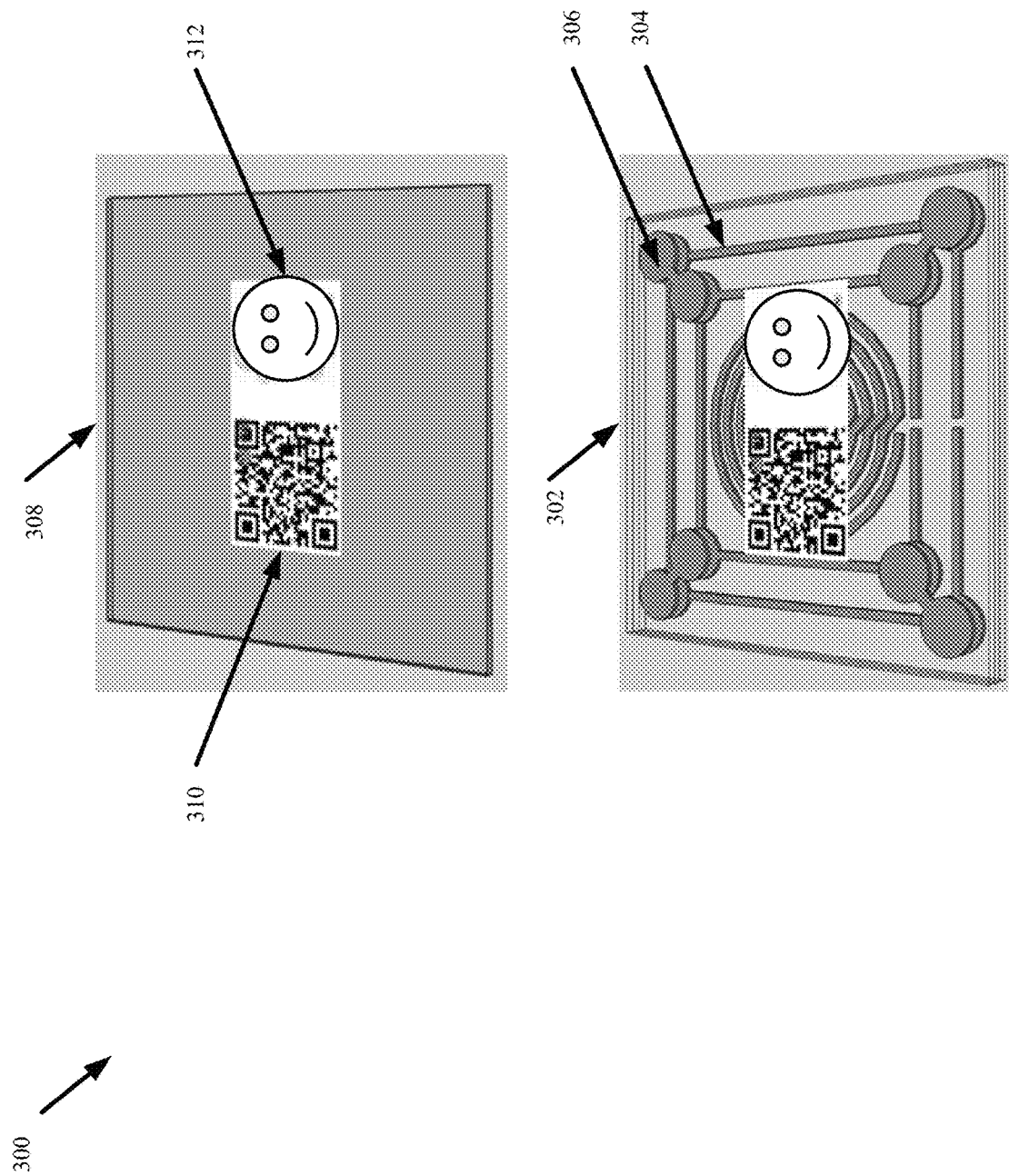
FIG. 3 represents a third example of the security device.

FIG. 3 represents a third example of the security device 300. The third example security device 300 includes a bulk security capacitance 302 having a first layer 304 with a first set of conductive elements and a second layer 306 with a second set of conductive elements, such a described in FIG. 2.

However, the third security device 300 also includes a third layer 308. The third layer 308 in various example embodiments may include printed matter, a photo, or some other item to be protected in support of the authentication process. In this example, the third layer 308 includes a QR code 310 and a picture or set of text 312, both used for authentication purposes. The third layer 308 in various example embodiments may be either on top of both the first and second layers 304, 306, in between the first and second layers 304, 306, or underneath the first and second layers 304, 306 depending upon the application.

In this example, the third layer 308 is non-transparent and is in between the first and second layers 304, 306. The second layer 306 is transparent so that the printed matter on the third layer 308 will be externally visible.

If there is an attempt to remove the photo 312 or QR code 310, first the corners of either the first or second layers 304, 306 will be picked off. When the thin trace between the pads (e.g. circles) is broken or the distance between any of the pads (e.g. circles) changes, the bulk security capacitance 302 will change and be detected by the tamper detection circuit in the security device 300.

Figure 4:
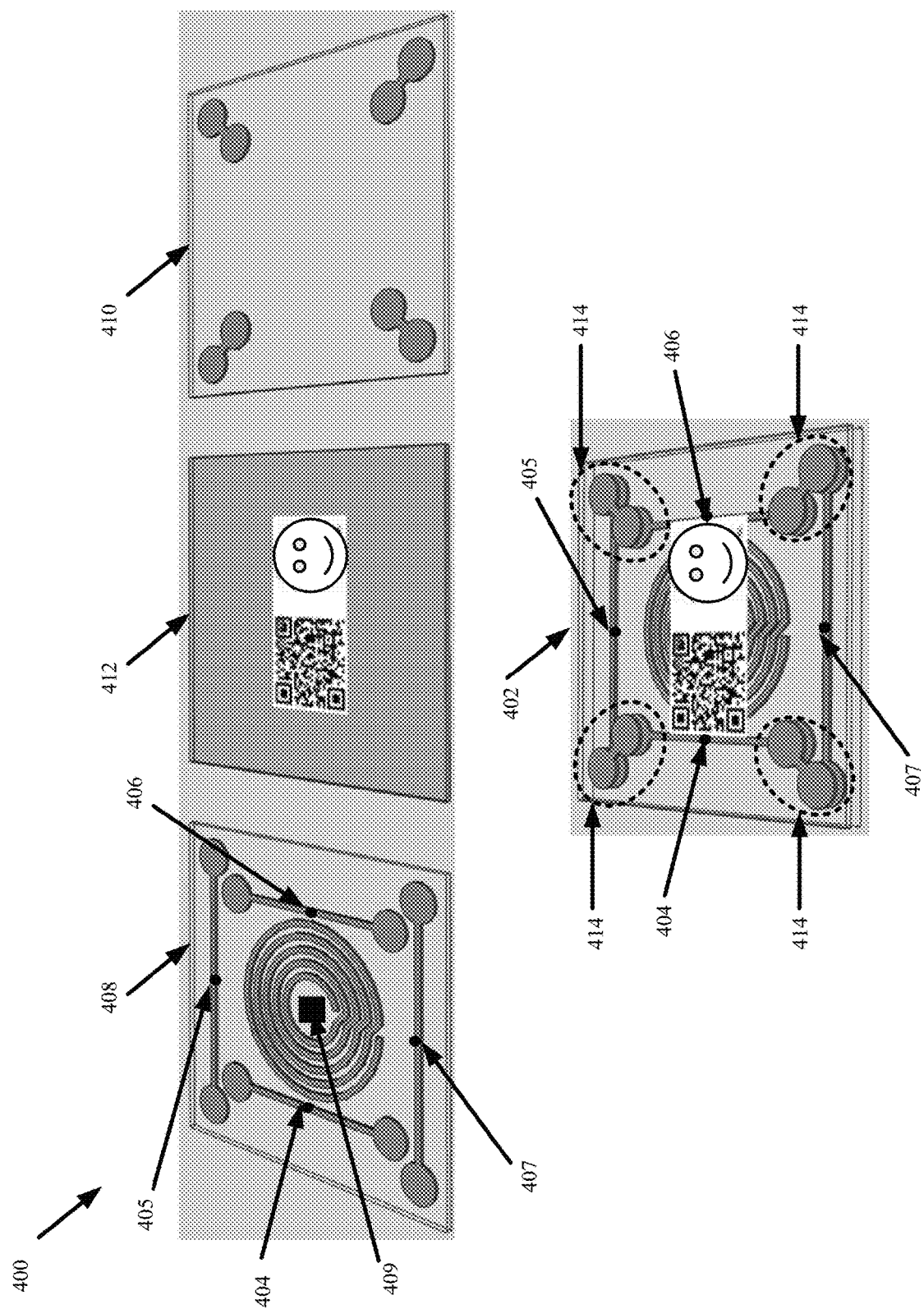
FIG. 4 represents a fourth example of the security device.

FIG. 4 represents a fourth example of the security device 400. The fourth example security device 400 includes a bulk security capacitance 402 having a first endpoint 404, a second endpoint 405, a third endpoint 406, and a fourth endpoint 407.

The bulk security capacitance 402 includes a first layer 408 having a first set of conductive elements and the endpoints 404, 406, 408, 410. The first layer 408 also includes an antenna and transceiver and tamper detection circuitry 409.

The bulk security capacitance 402 also includes a second layer 410 having a second set of conductive elements, such as shown in FIG. 2. The bulk security capacitance 402 then includes a third layer 412, perhaps having a QR code and a picture or text such as discussed in FIG. 3.

However, due to a different configuration of the first conductive elements in the first layer 408, the bulk security capacitance 402 is now configured to have eight bulk capacitors in series 414. These in series bulk capacitors and the positions of the endpoints 404, 406, 408, 410 enable the bulk security capacitance 402 to be configured as a capacitive Wheatstone Bridge.

Figure 6A:
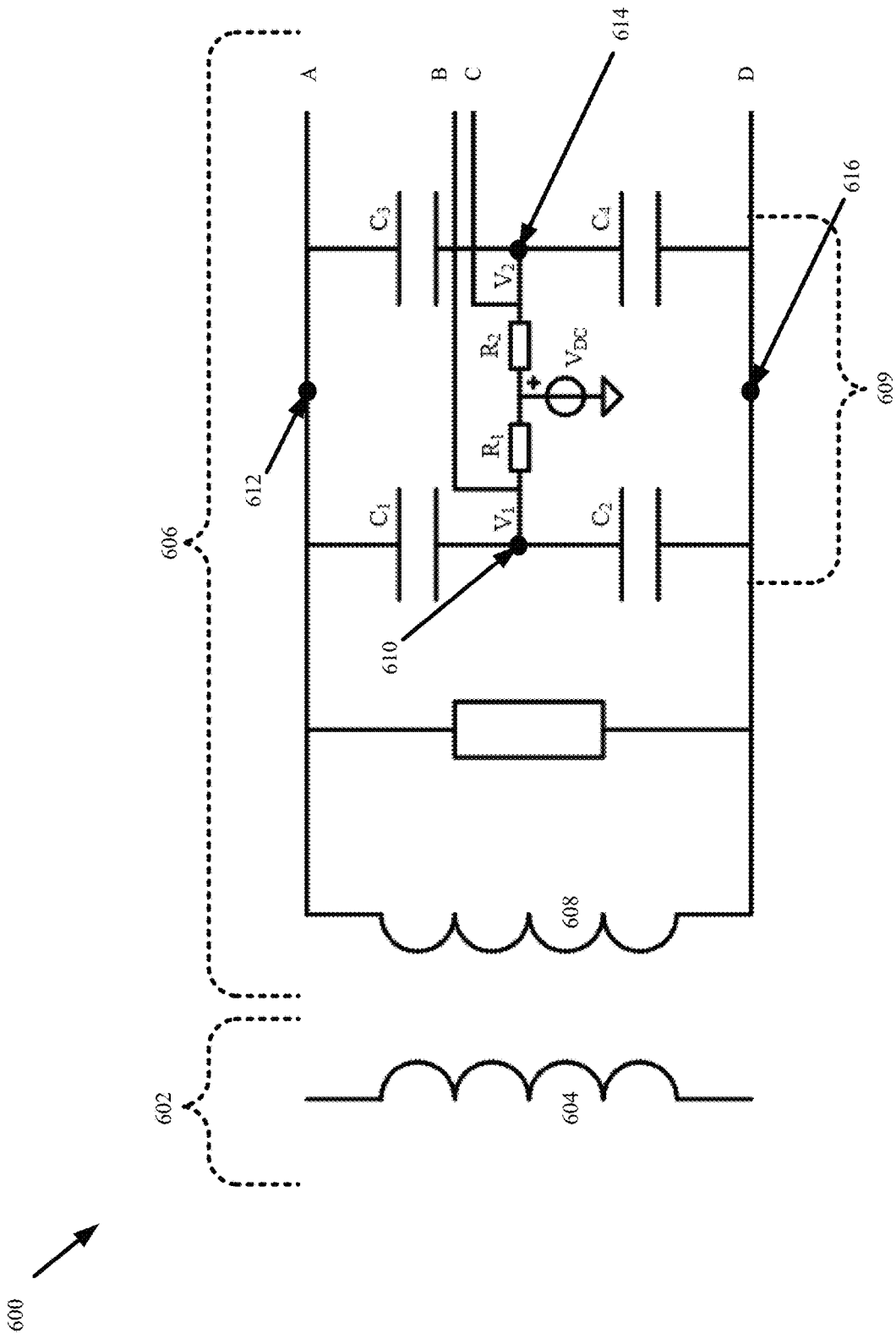
FIGS. 6A and 6B represent a second example tamper detection system including the fourth example of the security device embedded in another near-field device.
Figure 6B:
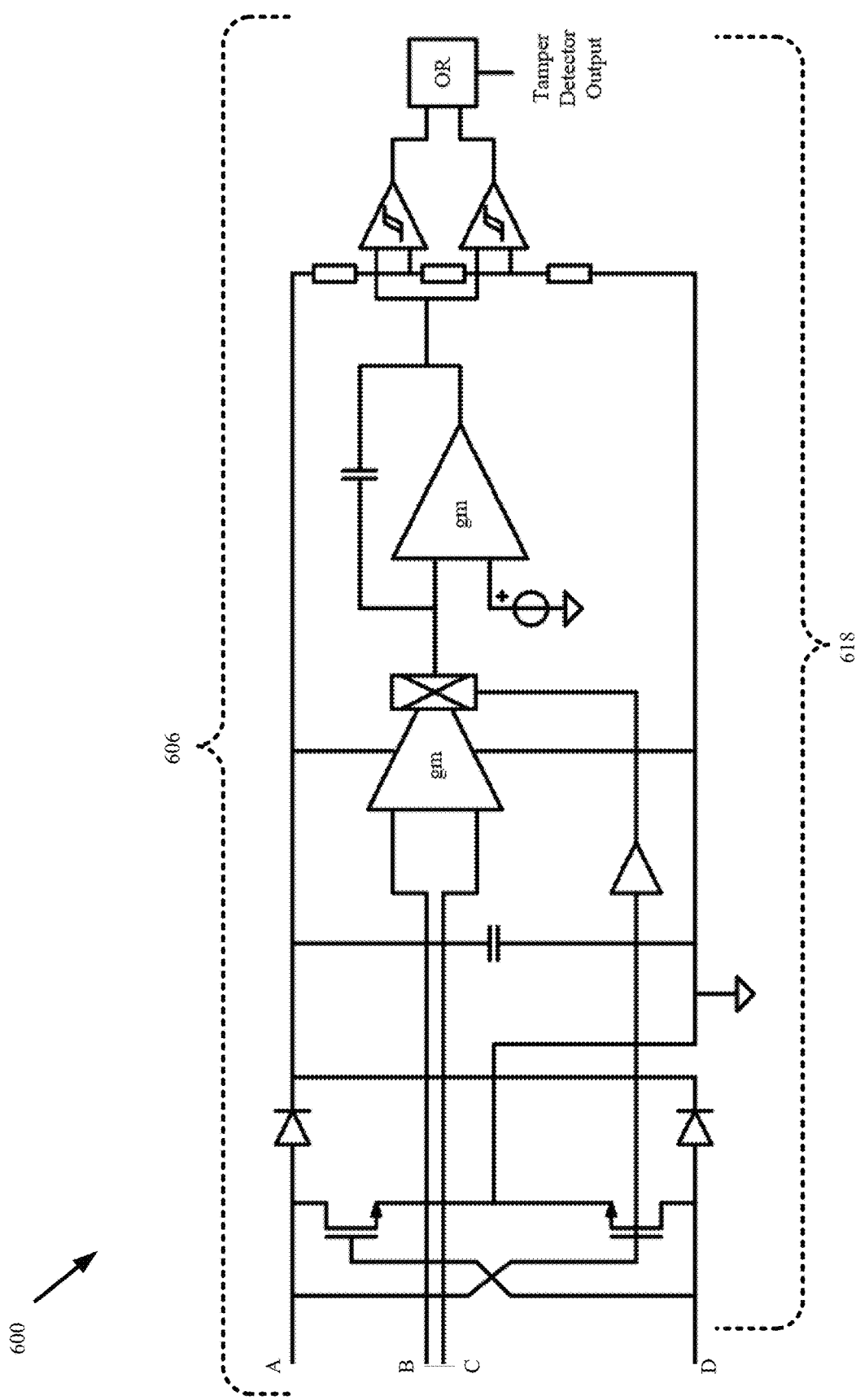

Such capacitive Wheatstone Bridge which coupled to a tamper detection circuit, such as shown in FIGS. 6A and 6B, enable a much more sensitive tamper detection/security device. Any tampering with this bulk security capacitance 402 configuration will unbalance the Wheatstone Bridge, resulting is a detectable tampering event.

Since these example bulk security capacitances 102, 202, 302, 402 are formed from capacitors, they can serve a dual-role in a variety of circuits that require capacitors.

In some example embodiments, the security device 100, 200, 300, 400 is configured for far-field operation. Far-field signals/communications are based on radio-frequency (RF) employing propagating RF plane waves propagating through free space. The capacitances 102, 202, 302, 402 can thus also be used in circuits such as the far-field receiver, the baseband circuits, or perhaps in capacitive display and/or touchscreens.

In other example embodiments, the security device 100, 200, 300, 400 is configured for near-field operation. The near-field signals/communications can be based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. NFEMI, NFEI, NFMI and NFC communications use non-propagating quasi-static E and/or H field signals.

In a near-field device, an H-field antenna (i.e. magnetic antenna) is primarily sensitive to magnetic fields and/or primarily initiates magnetic fields when driven by a current. Any E-field component from an H-field antenna is strongly reduced. A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

Also in a near-field device, an E-field antenna (i.e. electric antenna) is primarily sensitive to electric fields and/or primarily initiates electric fields when driven by a voltage. Any H-field component from an E-field antenna is strongly reduced. A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

The capacitances 102, 202, 302, 402 can thus also be used in circuits such as the near-field tuning circuits, demodulators, receivers, baseband circuits, or perhaps in capacitive display and/or touchscreens.

Figure 5:
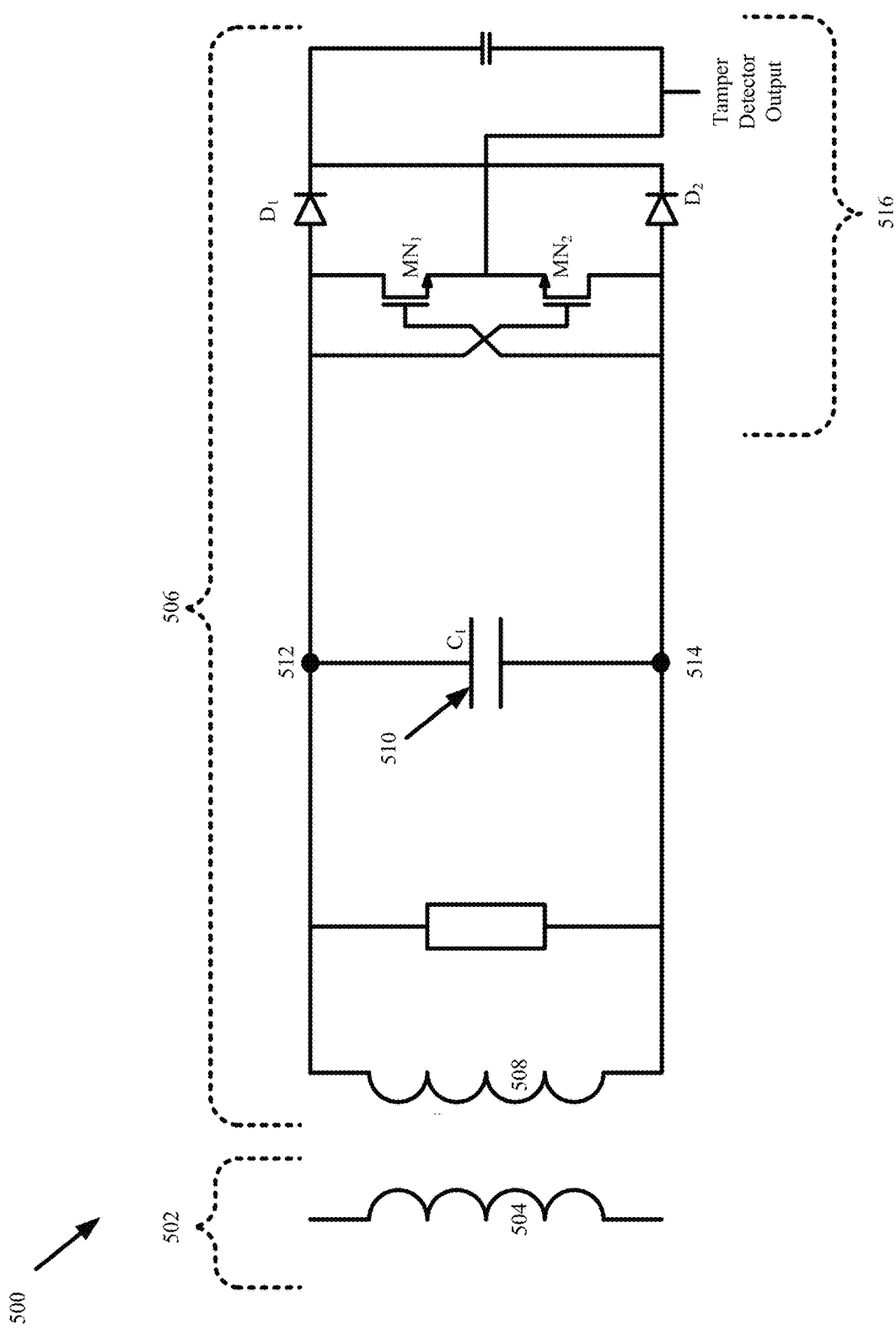
FIG. 5 represents a first example tamper detection system including the first example of the security device embedded in a near-field device.

FIG. 5 represents a first example tamper detection system 500 including the first example of the security device embedded in a near-field device. The first example tamper detection system 500 shows a first device 502 having a near-field antenna coil 504, and a second device 506 including a near-field antenna coil 508, a tuning capacitor 510, and transceiver and tamper detection circuitry 516. The tuning capacitor 510 includes a first endpoint 512 and a second endpoint 514, examples of which have been discussed in FIGS. 1, 2, and 3.

In this example embodiment, example security devices (e.g. 100, 200, 300 in FIGS. 1, 2, and 3) are powered by a near field communication (NFC) signal, and example capacitances 102, 202, 302 can also be used as the tuning capacitance 510 for the second device 506.

Tampering is detected if a distance between one or more of the capacitances' 102, 202, 302 conductive elements changes (e.g. due to peeling/removing one or more of the security device's layers), and/or if any of the conductive traces in either layer is damaged (e.g. torn).

FIGS. 6A and 6B represent a second example tamper detection system 600 including the fourth example of the security device embedded in another near-field device. Connection points between the tamper detection system 600 distributed over FIGS. 6A and 6B are identified as A, B, C, D.

The second example tamper detection system 600 shows a first device 602 having a near-field antenna coil 604, and a second device 606 including a near-field antenna coil 608, a Wheatstone tuning capacitance 609, and transceiver and tamper detection circuitry 618.

The Wheatstone tuning capacitance 609 (C1, C2, C3, C4) includes a first endpoint 610, a second endpoint 612, a third endpoint 614, and a fourth endpoint 616, an example of which has been discussed in FIG. 4.

In this example embodiment, example security devices (e.g. 400 in FIG. 4) are also powered by a near field communication (NFC) signal, and the Wheatstone Bridge configured capacitors (C1, C2, C3, C4) are also used as the tuning capacitance 609 for the second device 606.

Tampering is detected if a distance between one or more of the Wheatstone Bridge capacitances' (C1, C2, C3, C4) conductive elements changes (e.g. peeling/removing one or more of the security device's layers), and/or if any of the conductive traces in either layer is damaged (e.g. torn). R1, R2 and VDC define a DC voltage at an output of the Wheatstone Bridge 609. In response to tampering of at least one of the security device's layers, an AC voltage will appear across R1 and R2. This AC voltage is converted into a current by a first GM-stage. A mixer at the output of the GM-stage mixes the AC-signal to DC so that it can be integrated in a second GM-stage. Two comparators at the output then set a flag/bit/state/message if the second device 606 has been tampered with.

Due to the balances/unbalanced operation of the Wheatstone Bridge capacitance configuration, the second example tamper detection system 600 as a greater sensitivity to tampering.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A security device, comprising:
   a bulk security capacitance, including a first endpoint and a second endpoint, and having,
      a first layer including a first set of two conductive elements, the first endpoint, and the second endpoint; and
      a second layer including a second set of two conductive elements;
   wherein the first set of conductive elements and the second set of conductive elements together form at least two bulk capacitors in series;
   wherein the first and second layers are separated by a distance; and
   wherein the first and second endpoints are configured to be coupled to a tamper detection circuit configured to detect a change in the bulk security capacitance.

2. The device of claim 1:
   wherein the first set of conductive elements in the first layer includes a first pad coupled to the first endpoint, and a second pad coupled to the second endpoint;
   wherein the second set of conductive elements in the second layer include a first pad and a second pad; and
   wherein the only electrical coupling to the first pad and the second pad is a conductive trace coupling the first pad to the second pad.

3. The device of claim 2:
   wherein the first pad of the first set of conductive elements is positioned directly above the first pad of the second set of conductive elements; and
   wherein the second pad of the first set of conductive elements is positioned directly above the second pad of the second set of conductive elements.

4. The device of claim 2:
   wherein the first pads and the second pads form the at least two bulk capacitors in series.

5. The device of claim 2:
   wherein the first set of conductive elements in the first layer further include a plurality of additional pads, a first half of which are coupled to the first endpoint, and a second half of which are coupled to the second endpoint; and
   wherein the second set of conductive elements in the second layer further include a plurality of additional pairs of pads each pair coupled to each other with additional conductive traces.

6. The device of claim 3:
   wherein each pair of pads is separated from each other by an equal distance.

7. The device of claim 3:
   wherein a pair of pads is located at each corner of the second layer.

8. The device of claim 3:
   wherein the plurality of additional pads in the first and second layers form sets of in series bulk capacitors, each set of which is in parallel with each other.

9. The device of claim 1:
   wherein the first set of conductive elements in the first layer includes an inner set of pads coupled to the first endpoint, and an outer set of pads coupled to the second endpoint; and
   wherein the second set of conductive elements in the second layer include a first pad and a second pad coupled to each other with a conductive trace.

10. The device of claim 9:
    wherein the inner set of pads are each coupled to each other; and
    wherein the outer set of pads are each coupled to each other and surround the inner set of pads.

11. The device of claim 1:
    wherein the first layer further includes a third endpoint and a fourth endpoint; and
    wherein the first, second, third and fourth endpoints from the bulk capacitors in the security capacitance together form a capacitive Wheatstone Bridge.

12. The device of claim 1:
    further comprising a third layer coupled between the first layer and the second layer.

13. The device of claim 12:
    wherein either the first or second layers are translucent; and
    wherein the third layer includes at least one of: a picture, a QR-code, and/or printed text.

14. The device of claim 12:
    wherein the third layer includes an integrated circuit; and
    wherein the IC is galvanically coupled to the first set of conductive elements in the first layer.

15. The device of claim 1:
    wherein the first layer includes an antenna configured to be coupled to a transmitter or receiver.

16. The device of claim 15:
    wherein the transmitter or receiver includes a tuning circuit; and
    wherein the security capacitance is configured to alter tuning parameters in the tuning circuit.

17. The device of claim 16:
    wherein the tuning circuit includes at least four capacitors formed by the security capacitance.

18. The device of claim 16:
    wherein the security capacitance is configured to set at least one of a resonant operating frequency and/or an operating bandwidth of the antenna and the transmitter or receiver combination.

19. The device of claim 15:
wherein the antenna is configured to couple near-field signals to the transmitter or receiver.

20. The device of claim 19:
wherein the antenna includes,
- a coil configured to couple near-field magnetic signals to the transmitter or receiver; and
- a conductive plate configured to couple near-field electric signals to the transmitter or receiver.

21. The device of claim 1:
wherein the first and second layers can have a same or different shape; and
wherein the shape includes at least one of: a rectangle, an oval, a polygon, and/or a random organic shape.

22. A security device, comprising:
a bulk security capacitance, including a first endpoint and a second endpoint, and having,
- a first layer including a first set of conductive elements, the first endpoint, and the second endpoint; and
- a second layer including a second set of conductive elements;

wherein the first set of conductive elements and the second set of conductive elements together form at least two bulk capacitors in series;
wherein the first and second layers are separated by a distance;
wherein the first and second endpoints are configured to be coupled to a tamper detection circuit configured to detect a change in the bulk security capacitance;
wherein the first layer further includes a third endpoint and a fourth endpoint; and
wherein the first, second, third and fourth endpoints from the bulk capacitors in the security capacitance together form a capacitive Wheatstone Bridge.

* * * * *